US011035224B2

(12) United States Patent
Oguche et al.

(10) Patent No.: US 11,035,224 B2
(45) Date of Patent: Jun. 15, 2021

(54) DATA SYSTEMS, DEVICES, AND METHODS

(71) Applicant: Swellfix UK Limited, Aberdeenshire (GB)

(72) Inventors: Iko Oguche, Hampshire (GB); Andy Nelson, Orangevale, CA (US); Adam Edwards, Hampshire (GB)

(73) Assignee: SWELLFIX UK LIMITED, Aberdeenshire (GB)

( * ) Notice: Subject to any disclaimer, the term of this patent is extended or adjusted under 35 U.S.C. 154(b) by 368 days.

(21) Appl. No.: 15/766,074

(22) PCT Filed: Oct. 7, 2016

(86) PCT No.: PCT/GB2016/053126
§ 371 (c)(1),
(2) Date: Apr. 5, 2018

(87) PCT Pub. No.: WO2017/060721
PCT Pub. Date: Apr. 13, 2017

(65) Prior Publication Data
US 2018/0283169 A1 Oct. 4, 2018

(30) Foreign Application Priority Data
Oct. 7, 2015 (GB) .................................... 1517729

(51) Int. Cl.
E21B 47/12 (2012.01)
G06F 16/23 (2019.01)
(Continued)

(52) U.S. Cl.
CPC .............. E21B 47/12 (2013.01); E21B 41/00 (2013.01); G06F 16/2365 (2019.01); H04L 67/12 (2013.01)

(58) Field of Classification Search
CPC ..... E21B 44/00–47/26; G06F 16/23–16/2393; H04L 67/12–67/125
See application file for complete search history.

(56) References Cited

U.S. PATENT DOCUMENTS 4,742,458 A * 5/1988 Nathans ............... G01R 23/165
382/207
6,978,210 B1 * 12/2005 Suter ....................... E21B 49/00
702/13

(Continued)

FOREIGN PATENT DOCUMENTS

| EP | 1637695 A1 | 3/2006 |
| EP | 2921641 A1 | 9/2015 |
| WO | WO-2017060721 A1 | 4/2017 |

OTHER PUBLICATIONS

Search Report dated May 10, 2016, issued in corresponding British Application No. GB1517729.8.

(Continued)

Primary Examiner — Clayton R Williams
(74) Attorney, Agent, or Firm — Harness, Dickey & Pierce, P.L.C.

(57) ABSTRACT

There are described data system (200), devices and methods for use with well infrastructure (100). For example, such well infrastructure (100) may include oil and gas well structures, pipeline structures, and the like (110, 120, 130). In particular, there are described data systems (200), etc., for using data associated with monitored conditions at such well infrastructure (100). Such data systems (200) may comprise a data-storage facility (210) having stored data records associated with particular well infrastructures (100) (e.g. productions wells). The data system (200) may have one or more remote sensor devices (150) (e.g. gauges or distributed sensors) configured to monitor conditions at particular well infrastructures (100), and to collect condition data corre- (Continued)

sponding to those conditions. In some cases, a network-enabled server (220) is provided, in communication with the data-storage facility (210) and configured to receive from time to time, via a network (230), collected condition data from the one or more remote sensor devices (150), whereby the server (220) is configured to communicate that received condition data to the data-storage facility (210) for storing in appropriate data records. In such examples, the system (200) may be further configured to facilitate user access, via the network (230), to the data records comprising condition data stored at the data-storage facility (210).

26 Claims, 6 Drawing Sheets

(51) Int. Cl.
*E21B 41/00* (2006.01)
*H04L 29/08* (2006.01)

(56) References Cited

U.S. PATENT DOCUMENTS

| | | | | |
|---|---|---|---|---|
| 2004/0231851 | A1* | 11/2004 | Silvers | E21B 47/00 166/350 |
| 2009/0132458 | A1* | 5/2009 | Edwards | G06N 5/025 706/50 |
| 2012/0012308 | A1* | 1/2012 | Ziauddin | E21B 47/06 166/250.1 |
| 2013/0124171 | A1* | 5/2013 | Schuette | G06F 30/20 703/2 |
| 2014/0067353 | A1* | 3/2014 | Shelley | E21B 43/26 703/10 |
| 2014/0116776 | A1* | 5/2014 | Marx | E21B 47/00 175/24 |
| 2014/0351183 | A1* | 11/2014 | Germain | E21B 44/00 706/12 |
| 2014/0365409 | A1* | 12/2014 | Burch | E21B 41/0092 706/12 |
| 2015/0081264 | A1* | 3/2015 | Kumar | G01V 1/30 703/10 |
| 2016/0076926 | A1* | 3/2016 | McCann | G01F 1/712 73/152.29 |

OTHER PUBLICATIONS

International Search Report PCT/ISA/210 for International Application No. PCT/GB2016/053126 dated Dec. 22, 2016.
Written Opinion of the International Searching Authority PCT/ISA/237 for International Application No. PCT/GB2016/053126 dated Dec. 22, 2016.
International Preliminary Report for corresponding PCT Application No. PCT/GB2016/053126 dated Apr. 19, 2018.
Australian Office Action for corresponding Australian Patent Application No. 2016333751 dated Mar. 31, 2021.

\* cited by examiner

DATA SYSTEMS, DEVICES, AND METHODS

CROSS-REFERENCE TO RELATED APPLICATIONS

This application is a national phase under 35 U.S.C. § 371 of PCT International Application No. PCT/GB2016/053126 which has an International filing date of Oct. 7, 2016, which claims priority to Intellectual Property of Office of the United Kingdom Application No. 1517729.8, filed Oct. 7, 2015, the entire contents of each of which are hereby incorporated by reference.

TECHNICAL FIELD

Some described examples relate to data systems, devices and methods for use with well infrastructure. For example, such well infrastructure may include oil and gas well structures, pipeline structures, and the like. In particular, there are described data systems, etc., for using data associated with monitored conditions at such well infrastructure.

BACKGROUND

Significant innovation and development has occurred in recent years in relation to monitoring oil and gas wells, pipelines, and other such well infrastructures. However, while such infrastructure can be located at sites that are fairly easy to access, in other cases that infrastructure may be located at sites that are remote, and sometimes located in hostile environments. In some case, complete infrastructure associated with a particular formation or asset may be spread out across both these types of locations. As the capability of measurement systems and devices increases, there is a need to obtain securely and to process data collected by such systems and devices. Also, the ability to comprehend large volumes of data quickly and accurately can be vital when making safe and effective decisions on the management and control of an asset.

This background serves only to set a scene to allow a skilled reader to better appreciate the following description. Therefore, none of the above discussion should necessarily be taken as an acknowledgement that that discussion is part of the state of the art or is common general knowledge.

SUMMARY

In some examples, there are described data systems, devices and methods for use with well infrastructures (e.g. well and/or pipeline structures), and in particular for using data, for example storing, processing or otherwise analysing, and/or accessing data, associated with monitored conditions at such well infrastructures.

In one example, there is described a data system. That data system may comprise a data-storage facility (e.g. a database), which may be used to store data, for example data records, associated with one or more particular well infrastructures.

That well infrastructure may comprise a well structure, and/or pipeline structure, or the like. In other words, each data record may correspond to a particular well, and/or pipeline, or general location (e.g. comprising different infrastructure components). Each data record may comprise multiple fields against which particular data associated with conditions (e.g. monitored condition) at the well or pipeline may be stored. Such conditions may include properties of a well, or pipeline, or the like, which may be measured properties. For example, such properties may include temperature, pressure, vibration or acoustics, (distributed and/or point), or other specific conditions such as flow conditions (e.g. flow rates, flow composition, etc.), or formation conditions (e.g. formation pressure, permeability, rocktypes, etc.). Such conditions or properties may also include specifics regarding the well or pipeline, such as length, depth, position, configuration of well control devices, such as inflow control devices, present, past, and/or future (e.g. expected) configuration of such control devices at the well infrastructure, or the like.

The system may comprise one or more remote sensor devices, which may be used to monitor conditions at the particular well infrastructure. Such devices may be configured to collect "condition data" corresponding to the conditions at the well and/or pipeline.

In some examples, the remote sensor devices may comprise one or more distributed sensors, which may be configured to measure distributed conditions along some or all of the length of a well or pipeline structure. Examples of distributed sensors include distributed temperature sensors (DTS), distributed pressure sensors (DPS), distributed acoustic sensors (DAS), e.g. which can be used to measure vibration, or the like, each of which typically use optical fibres to obtain data usable to measure or determine conditions over a particular length of the sensor. The remote sensor devices may additionally or alternatively comprise point sensors configured to obtain data usable to measure conditions at one or more specific locations at a well or pipeline structure. Condition data may therefore comprise temperature data, pressure data, and/or acoustic data, as well as other data, whether that be distributed or point.

In some examples, the condition data may directly provide temperature data, pressure data, flow data, composition data, or the like. In other words, condition data collected from a well infrastructure may be stored for communication as temperature, pressure values, or the like. In other examples, the condition data may be usable, for example analysed as may be the case with distributed data, to provide subsequently specific temperature data, pressure data, flow data, composition data, or the like. In other similar words, the condition data may comprise "raw" data from the sensor devices for subsequent processing/analysis, and/or may comprise "processed" data from the sensor devices.

The system may additionally comprise a server (e.g. a network-enabled server). The server may be in communication with the data-storage facility. The server may be configured to receive from time to time condition data from the one or more remote sensor devices (e.g. receive via a network). In such examples, the server may be configured to communicate that received condition data to the data-storage facility for storing, for example, at an appropriate data record.

In some examples, the data system, for example the server, may be configured to perform a validation process on condition data received from one or more sensors. Such a validation process may be performed on condition data before communicating received condition data to the data-storage facility for storing. In other examples, the validation process may be performed at the data-storage facility after storage (e.g. in a batch process).

Responsive to the validation process, the system (e.g. server) may be configured to discard received condition data. In other similar words, the system may not store invalid condition data. Responsive to the validation process, the system may be configured to set an alert status in relation to that condition data. The alert status may be stored together with the condition data. The alert status and condition data may be communicated from the server to the data-storage facility for storing.

The system—or indeed if appropriate the server—may be configured (additionally or alternatively) to communicate the alert status to a remote user, via the network, responsive to the validation process.

The validation process may comprise comparing received condition data with one or more expected thresholds for that condition data (e.g. for that condition data of a particular well infrastructure associated with a remote sensor device). After comparing, the process may include confirming that the received condition data is invalid when the data is beyond a particular threshold. In other similar words, the process may confirm that the received condition data is invalid when an underlying parameter or parameters measured lies outside a defined range. For example, where the condition data comprises data regarding temperature, then the thresholds may be predefined temperature values (e.g. thresholds of 0° C. and 200° C.).

The validation process may comprise identifying the source of received condition data. The process may additionally comprise confirming that the condition data is valid when received condition data is from an expected source. In some examples, the source of the data may be identified, or indeed confirmed, by using metadata associated with received condition data (e.g. source IP address, MAC address, or the like).

The condition data may be encrypted for transmission, and subsequently decrypted at the server. The server may comprise public keys for the of each sensor device, for decryption of communicated condition data.

The system, and for example the network-enabled server, may be configured to receive condition data periodically from the one or more sensor devices (e.g. hourly, daily, weekly, monthly, etc.). In some examples, the system may be configured to receive condition data automatically from one or more sensor devices.

The network-enabled server may additionally or alternatively be configured to receive condition data after receipt of a user request. That user request may be received at the server, via a network. In other similar words, a user may initiate the receipt (e.g. initiate a request and receipt) of condition data from the one or more sensor devices.

In some examples, the system may be configured to process data to mitigate or removed errors and/or noise in the data. The system may be configured to store data in a manner that minimised data storage requirements.

For example, the system may be configured to overwrite condition data received from one time interval with data from another time interval, when stored at the data-storage facility. The system may be configured to average some or all condition data received for a particular well infrastructure measurement. Or in other similar words, the condition data stored at a particular data record may be averaged across two or more time intervals. For example, daily data (e.g. relating to temperature) may be averaged across a seven days to provide average daily condition data for a particular week. The system may be configured to average condition data received for a defined period, such as a day, week, or month.

The system, and for example the server, may further be configured to facilitate remote user access to the data records comprising condition data stored at the data-storage facility (e.g. via a network). In some examples, the system may be configured to facilitate remote user access and storage (e.g. upload) of additional record data, for example via the network, to the data records comprising condition data stored at the data-storage facility. In other similar words, the system may be configured to permit a user to upload additional data to the data-storage facility, and for that additional data to be associated and stored in a particular existing record.

In some examples, the network-enabled server may be configured, upon request from a third party, to communicate some or all of a particular data record to that third party, for example via the network. In such cases, the system—for example the server—may be configured to modify data in a requested record, based on the request from the third party (e.g. modified for ease of use/presentation at a third party).

The system may be further configured to restrict remote user access (e.g. based on the user privileges), via the network. Such restrictions may restrict the extent that a user can access condition data, modify data, access data records, etc.

In some further examples, the system may comprise one or more control devices, for example positioned at well infrastructures. The control devices may be downhole, subsea (e.g. at seabed), at surface, or the like. The control devices may be configured to modify conditions at the well infrastructure. Such control devices may be controllable so as to modify conditions by, for example, isolating or modifying production zones, changing flow rates, drawdown or injection pressures, or changing flow regimes, or the like, as will be understood (e.g. changing production and/or injection conditions). Exemplary control devices may include chokes, such as production chokes, injection chokes, safety valves, such as subsurface safety valves, or the like, zonal and/or lateral isolation apparatus, such as inflow control devices, or the like.

The one or more control devices may be in communication with the server (e.g. in a similar manner to the remote sensor devices). The one or more control devices may be in communication with the server using the same network connection (e.g. when using a Virtual Private Network). The server may be configured to monitor the control devices (e.g. monitor operating configurations). The server may be configured to communicate control data with the control devices in order to control, or at least modify, their operating configurations.

In some examples, the data system, for example the server, may be configured to perform a "decision process". In such examples, the system (e.g. server) may perform analysis of data in order to provide, as an outcome, recommendations for operation at the well infrastructure. The data used in a decision process may include condition data, but also may include further data, including weather data, commodity data, or the like.

For example, such a decision process may be performed subsequent to receiving condition data from one or more remote sensor sensors. Such a decision process may be performed before communicating received condition data to the data-storage facility for storing. In other examples, the decision process may be performed at the data-storage facility after storage (e.g. in a batch process).

Such a decision process may use received condition data and/or condition data stored at a particular data record, so as to determine one or more recommended/desired modifications to conditions at that well infrastructure. For example, based on particular observed conditions at a well infrastructure, the system may be configured to determine changes that may be made to change production (e.g. isolating water ingress), improve safety (e.g. observe failure conditions, and take action), or the like. In some examples, outcome recommendations may be determined in order to optimise well production.

In some examples, the system may initially perform a decision process to determine one or more changes to conditions at a well infrastructure, and then communicate, to a user, one or more recommendations for change at that well infrastructure based on the outcome of the decision process. The recommendations may be communicated together with data used as the basis for the decision process (e.g. condition data, and any additional data).

The system may be configured to communicate control data to the control devices based on the outcome of the decision process and/or recommendations communicated to a user. The user may be able to confirm the/each recommendation (e.g. remotely confirm one or more recommendations).

For some examples or decision outcomes, the system may be configured to communicate control data to control devices when confirmed by a user, for example only when confirmed by a user (e.g. responsive to receiving a recommendation). In other examples or decision outcomes, the system may be configured to communicate control data to control devices without having been confirmed by a user.

The system may be configurable, by a user, to determine in which particular circumstances to require user confirmation prior to issuing a control data communication. In other similar words, the system may be configurable to have "rules" for performing certain decision actions with or without user confirmation, and in some cases, those rules may be providable or changeable by a user (e.g. remotely configurable).

In some examples, the system may be configured to perform a "confirmation process" subsequent to communicating control data to a control device. In such examples, the system (e.g. server) may perform analysis of condition data subsequent to communicating control data. For example, the system may be configured to use/compare present condition data with previous condition data (e.g. compare an expected outcome of a change in condition at a well infrastructure with the actual outcome of a change in condition at a well). The system may be configured to store the outcome of a confirmation process (e.g. at the data store), and associate a weighting factor with the associated decision process based on a comparison between the expected and actual change in conditions (e.g. the closer the actual/expected conditions, the greater the weighting factor).

For subsequent decision processes (e.g. and user recommendations), a user may be informed of a weighting factor, or the like, associated with a particular decision outcome (e.g. to guide the user as to likelihood of actual conditions being modified). The weighting factor may be considered to be a confidence factor, or the like.

In some examples, the weighting factor may be averaged across multiple same or similar decision outcomes, whether at the same well infrastructure or indeed further well infrastructures.

In some examples, there is described a data system, comprising:
  a data-storage facility having stored data records associated with particular well infrastructures, for examples, well and/or pipeline structures;
  one or more remote sensor devices configured to monitor conditions at particular well infrastructures, and to collect condition data corresponding to those conditions;
  a network-enabled server, in communication with the data-storage facility and configured to receive from time to time, via a network, collected condition data from the one or more remote sensor devices, the server configured to communicate that received condition data to the data-storage facility for storing in appropriate data records, and
  the system further being configured to facilitate user access, for example remote user access via the network, to the data records comprising condition data stored at the data-storage facility.

In some examples, there is described a data system, comprising:
  a data-storage facility having stored data records associated with well infrastructure;
  a network-enable server, in communication with the data-storage facility and configured to receive from time to time, via a network, data associated with particular well infrastructure, the server configured to communicate that received data to the data-storage facility for storing in an appropriate data record,
  the system further being configured to facilitate user access (e.g. remote user access) to data records stored at the data-storage facility.

In some examples, there is described a data system, comprising:
  one or more remote sensor devices configured to monitor conditions at particular well infrastructure (e.g. well and pipeline structures), and to collect condition data corresponding to those conditions;
  the remote sensors further being configured to communicate, from time to time, via a network, condition data to a network-enabled server, for storage at a data-storage facility in appropriate data records corresponding to the particular well infrastructure.

In some example, the system may be further configured to facilitate remote user access, via the network, to the remote sensors, via the network.

In some examples, there is described a method of data storage, and/or usage.

The method may comprise storing data records associated with particular well infrastructure (e.g. well and/or pipeline structures) at a data-storage facility. The method may comprise monitoring conditions of those well or pipeline structures, for example, using the one or more sensor devices. The sensors may be distributed sensors and/or point sensors. As such, the data obtained from the sensors (e.g. condition data) may be distributed data and/or point data.

The method may comprise receiving at a network-enabled server, from time to time, condition data derived from the one or more remote sensor devices; and communicating that received condition data to the data-storage facility for storing in appropriate data records. The method may comprise facilitating user access, for example remote via the network, to the data records comprising condition data stored at the data-storage facility.

The method may comprise modifying conditions at the well infrastructure, for example, using one or more control devices positioned at well infrastructures. The method may comprise modifying conditions by changing flow rates, or in flow regimes, or the like, as will be understood.

The method may comprise monitoring the control devices using the server. The method may comprise communicating control data from the server to the control devices in order to control their operation.

The method may comprise performing a "decision process". In such examples, the method may comprise performing analysis of data in order to provide, as an outcome, recommendations for operation at the well infrastructure. The data used in a decision process may include condition data, but also may include further data, including weather data, commodity data, or the like.

A decision process may be performed subsequent to receiving condition data from one or more remote sensor sensors. Such a decision process may be performed before communicating received condition data to the data-storage facility for storing. In other examples, the decision process may be performed at the data-storage facility after storage (e.g. in a batch process).

The decision process may comprise using received condition data and/or condition data stored at a particular data record, and determining one or more desired modifications to conditions at that well infrastructure. For example, based on particular observed conditions at a well infrastructure, the method may comprise determining changes that may be made to change production (e.g. isolating water ingress), improve safety (e.g. observe failure conditions, and take action), or the like.

The method may comprise initially performing a decision process to determine one or more changes to conditions at a well infrastructure, and then communicating, to a user, one or more recommendations for change at that well infrastructure based on the outcome of the decision process.

The method may comprise communicating control data to the control devices based on the outcome of the decision process and/or recommendations communicated to a user.

The method may comprise communicating control data to control devices when confirmed by a user, for example only when confirmed by a user (e.g. responsive to receiving a recommendation). In other examples or outcomes, the method may comprise communicating control data to control devices without having been confirmed by a user.

The method may comprise determining (e.g. user determining) in which particular circumstances to require user confirmation prior to issuing a control data communication.

The method may comprise performing a confirmation process subsequent to communicating control data to a control device. The confirmation process may comprise comparing an expected outcome of a change in condition at a well infrastructure with the actual outcome of a change in condition at a well (e.g. based on received condition data). The method may comprise associating a weighting factor, or the like, with that performed decision or recommendation by comparing the expected and actual change in conditions (e.g. the closer the actual/expected conditions, the greater the weighting factor).

For subsequent decision processes (e.g. and user notifications), the method may comprise informing a user of a weighting factor associated with a particular decision outcome or recommendation (e.g. to guide the user as to likelihood of actual conditions being modified). The weighting factor may be considered to be a confidence factor, or the like. A weighting factor may be averaged across multiple same or similar decision outcomes.

In some examples, there is described a method comprising:
storing data records associated with particular well infrastructure at a data-storage facility;
monitoring conditions at that particular well infrastructure, and collecting condition data corresponding to monitored conditions;
receiving at a network-enabled server, from time to time, condition data derived from the one or more remote sensor devices; and communicating that received condition data to the data-storage facility for storing in appropriate data records, and
facilitating user access, for example remote user access via the network, to the data records comprising condition data stored at the data-storage facility.

In some examples, there is provided a computer program product or computer file configured to at least partially (or fully) implement the systems, devices and methods as described above (e.g. the network-enabled server).

In some examples, there is also provided a carrier medium comprising or encoding the computer program product or computer file. In some examples, there is also provided processing apparatus when programmed with the computer program product described. Some of the above examples may implement certain functionality by use of software, but that functionality could equally be implemented mainly or solely in hardware (for example by means of one or more ASICs (application specific integrated circuit) or Field Programmable Gate Arrays (FPGAs)), or indeed by a mix of hardware and software (e.g. firmware). As such, the scope of the disclosures should not be interpreted as being limited only to being implemented in software or hardware.

Aspects of the inventions described may include one or more examples, embodiments or features in isolation or in various combinations whether or not specifically stated (including claimed) in that combination or in isolation. It will be appreciated that one or more embodiments/examples may be useful with data storage, and use thereof, particularly when storing and using condition data associated with well or pipeline structures.

BRIEF DESCRIPTION OF THE FIGURES

A description is now given, by way of example only, with reference to the accompanying drawings, in which.

DESCRIPTION OF SPECIFIC EMBODIMENTS

Some of the following examples have been described specifically in relation to well infrastructure relating to oil and gas production, or the like. In particular, some of the examples describe the monitoring of conditions, and storage of data from wells and pipeline structures used during production of oil and gas. However, it will be appreciated that aspects of the systems, devices and methods described herein may equally be used in other circumstances, and when other data may be collected or used. Further, the systems, devices and methods disclosed herein may be used beyond oil and gas production.

Figure 1:
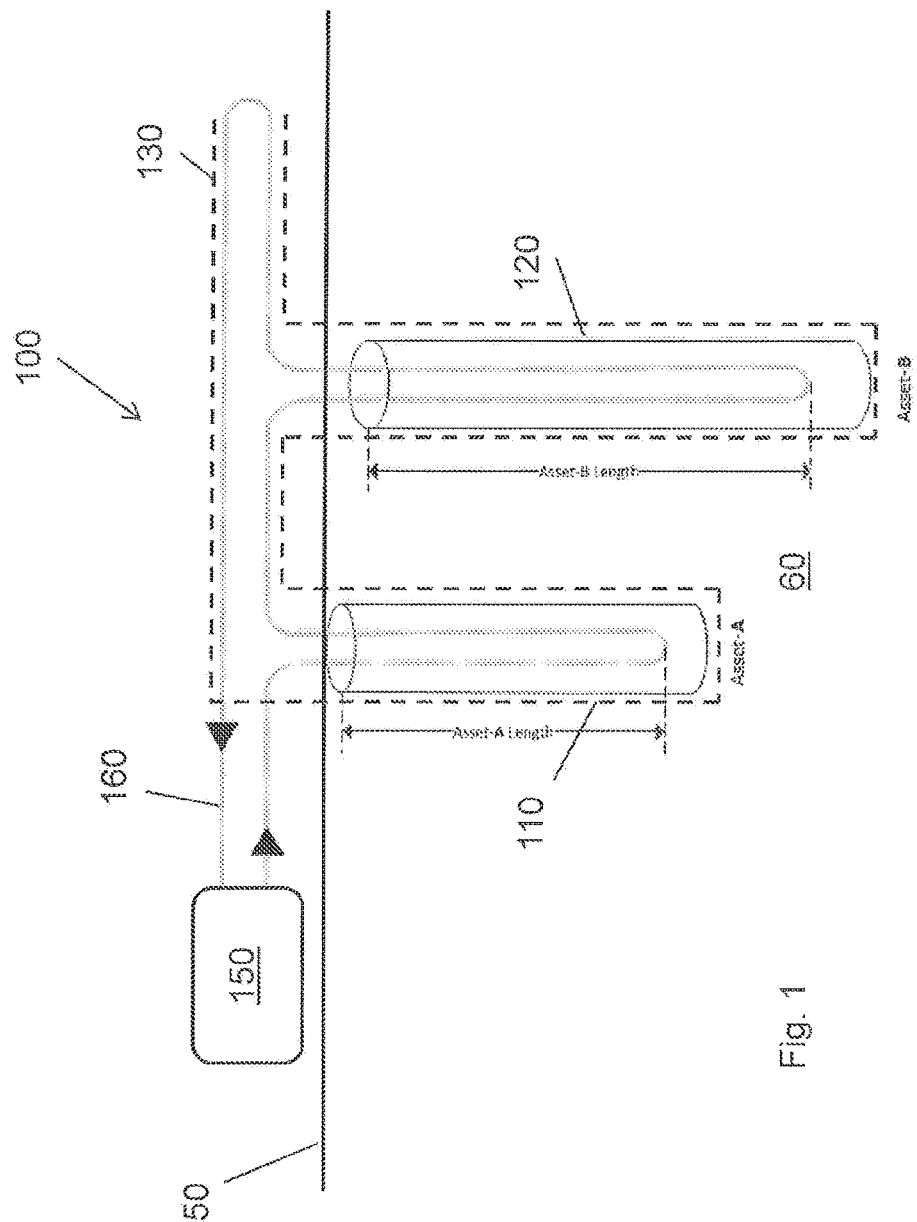
—
FIG. 1 shows a simplified representation of well infrastructure.

FIG. 1 shows a simplified representation of well infrastructure 100 provided at a particular production site 50. Here, the infrastructure 100 comprise two subterranean well structures 110, 120 extending into a hydrocarbon-bearing formation 60, together with a pipeline structure 130 for transportation of fluids from the wells 110, 120. For simplicity, any additional components, such as wellheads, trees, manifolds, or the like, are not shown. Also, although the well structures 110, 120 have been presented as vertical, it will be appreciated that such structure may indeed be deviated, or the like.

FIG. 1 further shows a sensor device 150 provided at the production site 50. Here, the sensor device 150 comprises a distributed sensor arrangement 160, comprising optical fibres extending along both well structures 110, 120 as well as along the pipeline structure 130. The distributed sensor arrangement 160 is configured to measure conditions at the well infrastructure 100, and in particular temperature, pressure, vibration, or the like, in a known manner. Accordingly, the sensor device 150 can be configured to monitor and collect "condition data" associated with such conditions at the well infrastructure 100. Here, knowledge of condition data may be important to the operation of the well, or equipment associated with the well, or indeed for the scheduling of subsequent work-overs, or the like. Also, knowledge of condition data may help identify early any problems or failures at the well infrastructure.

Therefore, while in FIG. 1, a distributed sensor is shown by way of an example, it will be appreciated that the remote sensor device 150 may additionally or alternatively comprise, or be in communication with, point sensors, or the like, configured to measure conditions at one or more specific locations at the well or pipeline structures 110, 120, 130. The remote sensor 150 may be configured to obtain other condition data at the site 50.

In such cases, and for the purposes of the following description, condition data obtained by the sensor device 150 may therefore comprise temperature data, pressure data, and/or acoustic data, as well as other data, whether that be distributed (e.g. traces) or point (e.g. specific values). A skilled reader will readily be able to implement the various embodiments.

In any event, the sensor device 150 is configured to collect condition data for subsequent data communication, as will be described. It is noted that the term "data communication", unless otherwise stated, may encompasses any method and associated apparatus for communicating data, for example optical and electrical methods. Data communication may be wired or wireless or a combination of both.

Therefore, data communication may be, for example, a network communication over a wired connection or a network communication of over a radio frequency connection, or both.

Figure 2:
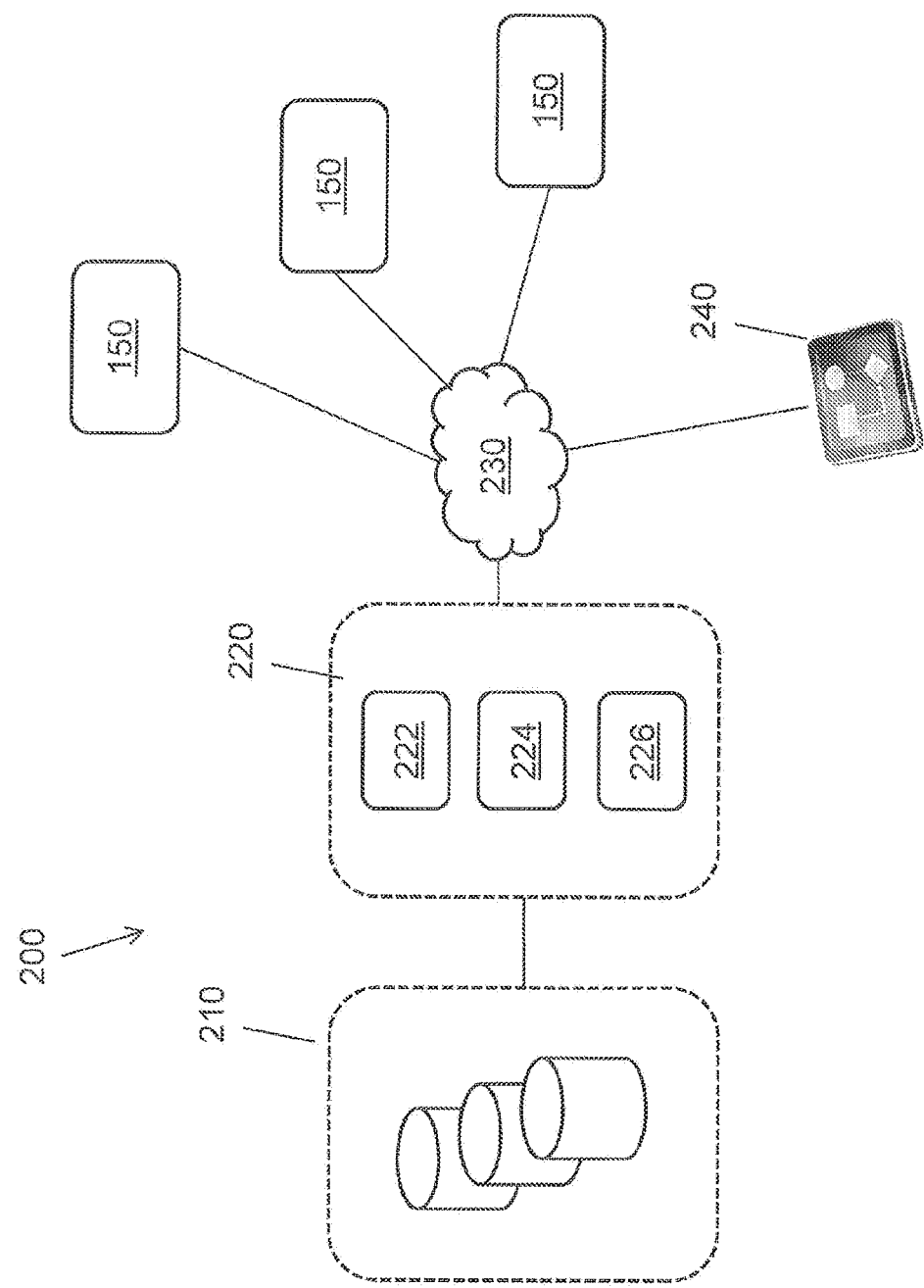
FIG. 2 shows a simplified representation of a data system.

FIG. 2 shows an example of a data system 200 for use with condition data (e.g. data obtained from sensor devices 150 of FIG. 1). Here, the data system 200 comprises a data-storage facility 210, or database.

The data-storage facility 210 contains data records associated with particular well infrastructures 100, for example, the well and/or pipeline structures 110, 120, 130 of FIG. 1. In other words, each data record may correspond to a particular well 110, 120, and/or pipeline 130, infrastructure 100, or site 50. Each data record stored at the data-storage facility comprises multiple fields against which particular data associated with monitored conditions at the well or pipeline can be stored. Such conditions may include temperature, pressure, vibration or acoustics, (distributed and/or point), or other specific conditions such as flow conditions (e.g. flow rates, flow composition, etc.), or formation conditions (e.g. formation pressure, permeability, rocktypes, etc.). Such conditions may also include specifics regarding the well or pipeline, such a length, depth, position, configuration of well control devices, such as inflow control devices, or the like. As is shown in FIG. 1, each well 110, 120, have a different length, and that data can stored in an appropriate data record. In the example shown, the data-storage facility can be initially configured using SQL database script, or the like, in a manner known. Data can also be stored in encrypted formats.

FIG. 2 further shows a server 220 in communication with the data-storage facility 210. Here, the server comprises a processor 222 and memory 224, configured in a known manner. It will be appreciated that the memory 224 may comprise a non-volatile memory and/or a volatile memory. The memory 224 may have a computer program stored therein, configured to undertake the methods disclosed herein. The computer program may be loaded in the memory 224 from a non-transitory computer readable medium, on which the computer program is stored. Here, the server 220 further comprises a communication module 226 configured to permit data communication between the server and a network 230 (e.g. the Internet), as well as to communicate with the data-storage facility 210.

In some examples, the server 220 additionally comprises a user interface to permit a local user to configure or modify the data-storage facility 210. This may also optionally permit the administration of user access to the data-storage facility 210, as will be described.

The data system 200 in FIG. 2 further comprises three remote sensor devices 150 similar to that described in relation to FIG. 1 (e.g. provided at a particular remote production site 50). In these examples, each of the remote sensors devices 150 are in communication with the server 220 via the network 230 (e.g. via FTP, FTPS, SFTP, HTTP, HTTPS connection, or the like). It will be appreciated that in some cases, it may not be a remote sensor device 150, per se, that is in communication with the server 220, but rather some intermediary device may be used. For example, in circumstances in which the sensor devices 150 are deployed at sites beyond network connectivity, then in those cases, a transfer of condition data from the sensor device 150 to an intermediary device may be desired in order to store condition data on a network enabled device, or networked user equipment, for subsequent communication to the server 220. In such cases, the remote sensor devices 150 may still, for the purposes of explanation, be considered to be "in communication" with the server 220.

Here, the server 220 is configured to receive from time to time, via the network 230, collected condition data from the one or more remote sensor devices 150. Depending on the particular remote sensor, the system 200, and for example the network-enabled server 220, can be configured to receive condition data periodically from each of the sensor devices 150 (e.g. hourly, daily, weekly, monthly, etc.). In some cases, different condition data may be collected at different times for the same remote sensor device.

In this particular example, upon receipt of condition data from remote sensor devices, the server 220 is configured to perform a validation process on that data, as will be described. By performing a validation process, the likelihood of erroneous data being stored at the data-storage facility 210 is reduced.

During the initial validation process, the server may perform corruption checks (e.g. using check bits, or algorithms).

Subsequently, during the validation process, the server 200 confirms the identity of the source of condition data. In some examples, the source of the data may be identified, or indeed confirmed, by using metadata associated with received condition data (e.g. source IP address, MAC address, or the like). Any identification data may be compared to expected identification data for that particular remote sensor device 150. In some cases, the expected source identification may be stored at an appropriate data record. If the server 220 confirms that the data being received is from a genuine or expected source, then the server 220 can communicate that data for storage at the data-storage facility 210. In some examples, the condition data may be encrypted for transmission, and subsequently decrypted at the server 220. In those examples, the server 220 may use the process of decryption of communicated condition data as a way to identify the source of the data, in a known manner.

Further, the validation process comprises comparing received condition data with one or more expected thresholds for that condition data (e.g. for that condition data of a particular well infrastructure 100 associated with a remote sensor device 150). For example, where the condition data comprises data regarding temperature, then the thresholds may be predefined temperature values for that site 50, or structure 110, 120, 130 (e.g. thresholds of 0° C. and 200° C.).

After comparing data with one or more thresholds, the server 220 is configured to confirm that the received condition data is invalid, or indeed the well infrastructure 100 is operating at conditions that may require user notification, when an underlying parameter or parameters measured lie outside defined ranges. In such a way data that is erroneous, or sits outside of expected conditions, can be identified. In some examples, the system 200 can be configured to permit a user-defined thresholds, or rules. Notifications communicated to users may also include information regarding possible reasons, or remedies that may be required.

Responsive to the validation process, the system 200 may be configured to discard received condition data (e.g. not store or communicate invalid condition data to the data-storage facility 210). However, in some examples—e.g. when the data is beyond expected thresholds—the system 200 may be configured to set an alert status in relation to that received condition data. The alert status may be stored together with the condition data (e.g. for future viewing). In other words, the alert status and condition data may be communicated from the server 220 to the data-storage facility 210 for storing.

However, the system 200—or indeed if appropriate the server 220—may be configured (additionally or alternatively) to communicate the alert status to a remote user 240, via the network 230, responsive to the validation process. In such a way, a remote user 240 may be able to promptly be notified of a potential error or problem at a site 50.

It will be appreciated that validation process may comprise one or both of the described steps, and may, in some cases, be performed at the data-storage facility 210 after storage (e.g. in a batch process), rather than at the server 220.

As mentioned above, the network-enabled server 220 may be configured to receive condition data periodically from the sensor devices 150 (e.g. hourly, daily, weekly, monthly, etc.). In the example described, the server 220 is configured to receive condition data automatically from the sensor devices 150, without necessarily any user input.

That said, the system 200 can also be configured additionally or alternatively to receive condition data after receipt of a user request. That user request may be received at the server 220 via the network 230, for example, from a remote user 240. In other similar words, a user may in some cases, initiate the receipt (e.g. initiate a request and receipt) of condition data from the one or more sensor devices 150. Such a request may follow from a received alert notification, for example.

In any event, after receipt of condition data (and possibly validation), the server 220 is configured to communicate that received condition data to the data-storage facility for storing in appropriate data records. In some examples, the system 200 may be configured to process received condition data in such a manner so as to mitigate or removed errors and/or noise that may be present in the data. Further, the system 200 may be configured to store data in a manner that minimises data storage requirements at the data-storage facility.

For example, in some cases, the system 200 can be configured to store cumulative averaged data of condition data received for a particular well infrastructure 100. Or in other similar words, the condition data stored at a particular data record can be averaged across two or more receipt time intervals. For example, daily data (e.g. relating to temperature) can be averaged across a seven days to provide average daily condition data for a particular week. The system 200 may be configured to average condition data received for a defined period, such as a day, week, or month.

In use, user profiles can be established and stored at the server (or indeed at the data-storage facility). Access to data records and stored condition data may only be permitted with an appropriate user profile and, for example, when a secure access procedure is followed.

Here, for example, the system 200 is configured to facilitate user access, and indeed remote user access via the network 230, to the data records comprising condition data stored at the data-storage facility 210. A user, having an existing user profile, may access the server, using the network 230, and a web-based user interface, permitting a user to view data from data records. The web-based interface may require login and password details to be provided. Visualisation of data via the web-interface may be provided using an application program interface.

It will be appreciated, not least of all because of the web-based access, that the user access may be provided from any number of different end user equipment devices that can connect to the server 220 (e.g. using the Internet). In such a way, no installation is required at the remote user.

It will also be appreciated that due to the manner in which any of the described systems and methods are implemented in a web-based manner, no dedicated software need be required at the user, and indeed the system may be facilitated using known web browsers or web access means. In other similar words, there may be no requirement for the remote user equipment to have installed specific or dedicated programs, or the like.

The system 200, and for example the server 220, can further be configured to facilitate remote user access in order to facilitate access and storage (e.g. upload) of additional record data, for example via the network 230, to the data records comprising condition data stored at the data-storage facility 210. In other similar words, the system 200 can permit a user to upload additional data to the data-storage facility 210, and for that additional data to be associated and stored in a particular existing record. Such additional data may include pictures of sites, or specific information regarding the well infrastructure 100, or the like.

In addition, in some examples, the system may permit a user to modify stored data, or modify the scheduling of receiving data from sensor devices 150. It will be appreciated, that in some cases, each user may be assigned a particular privilege, permitting limited access or control of data. In other words, the system 200 may be further configured to restrict remote user access (e.g. based on the user privileges), via the network 230. Such restrictions may restrict the extent to which a user can access condition data, modify data, access data records, etc. In addition, certain export restrictions may be applied to different users.

It will be appreciated therefore, that different commercial entities may use the same server 220 and data-storage facility 210, and have access to data relevant to their sensor devices 150.

While the well infrastructure 100 of FIG. 1 was shown with remote sensor devices 150, it will be appreciated that with such well infrastructure 100 there may also be a number of control devices 400, configured to control or modify conditions at that well structure 100.

Figure 3:
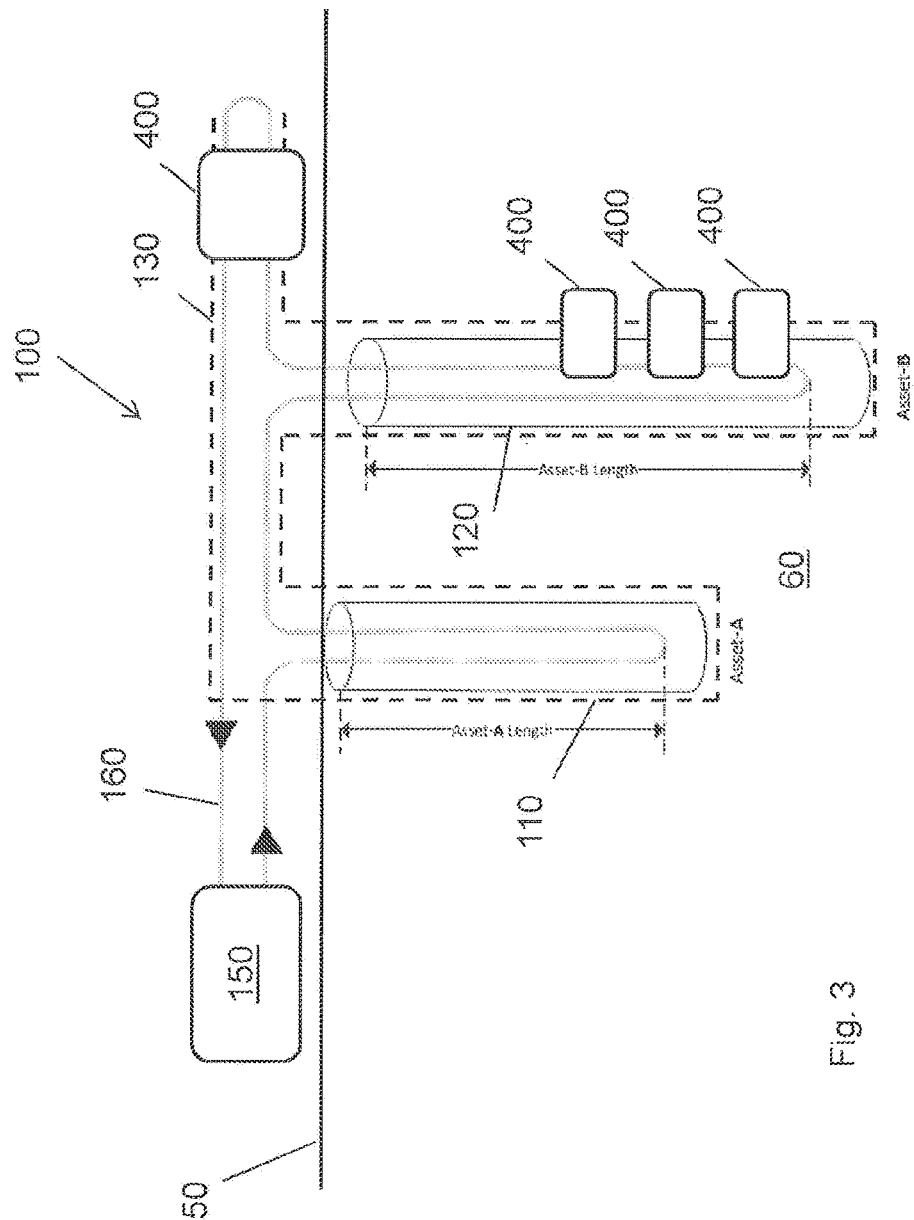
FIG. 3 shows a simplified representation of the well infrastructure of FIG. 1 further comprising control devices.

FIG. 3 shows an example of the well infrastructure 100 of FIG. 1 again with the sensor device 150 comprising the distributed sensor arrangement 160 extending along both well structures 110, 120 as well as along the pipeline structure 130. In this example, however, the system 200 comprises one or more control devices 400, positioned at well infrastructures 100. Here, one control device 400 is positioned at the at pipeline structure 130, while three control devices 400 are positioned at the well structure 120.

In each case, the control devices 400 are configured to modify conditions at the well infrastructure 100. For example, such control devices 400 may be configured to modify conditions by changing flow rates, drawdown or injection pressures, or flow regimes, etc. and may include chokes, such as production chokes, injection chokes, safety values, such as subsurface safety values, or the like, zonal and/or lateral isolation apparatus, such as inflow control devices, or the like. Here, some or all of the control devices 400 may be operable using instructions (i.e. control data) received from the server, 220, as will be explained.

Figure 4:
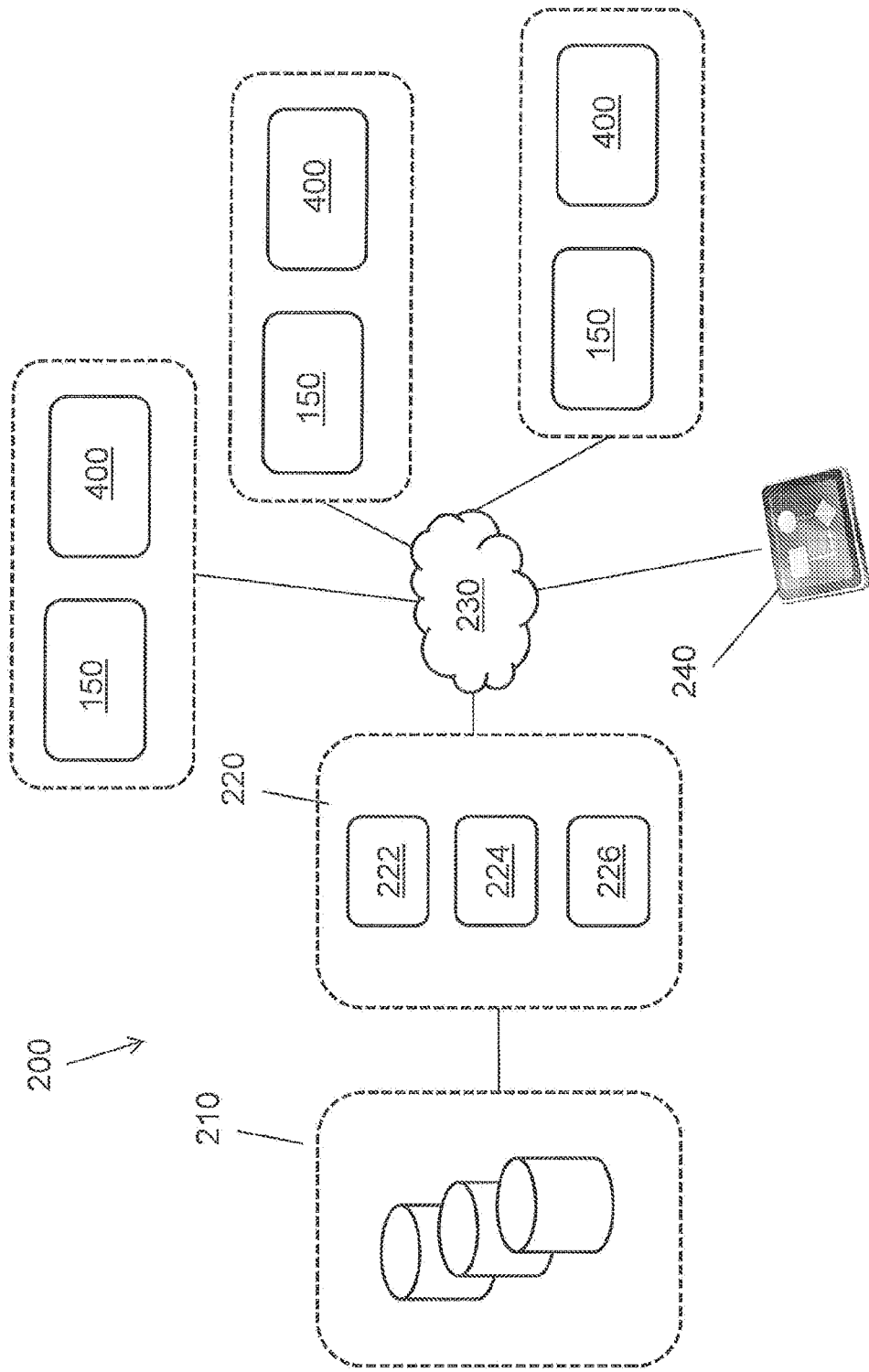
FIG. 4 shows a simplified representation of the data system of FIG. 2 for use with the infrastructure of FIG. 3.

FIG. 4 shows an example of the data system 200 of FIG. 2 for use with control data (e.g. data for operatively controlling the control devices 400 of FIG. 3).

Here, the data system 200 is further in communication with the remote control devices 400 similar to that described in relation to FIG. 3 (e.g. provided at a particular remote production site 50). Each of the control devices 400 are in communication with the server 220 via the network 230 in a similar manner to the remote sensor devices 150, and in some examples share the same network connection (e.g. communicate over the same VPN). In this particular example, the server 220 can be configured to monitor the control devices (e.g. monitor current operation/configuration), and to communicate from time to time control data with the control devices 400 in order to control their operation, and optionally receive data from the control devices regarding their operative configuration.

As with remote sensor devices 150, in some cases a control device 400 may be indirectly in communication with the server 220, via an intermediary device. For example, in circumstances in which the control devices 400 are deployed at sites beyond network connectivity, then in those cases, a transfer of control data between the server 220 and control device 400, using an intermediary device, may be desired in order to store control data on a network enabled device, or networked user equipment, for subsequent communication to/from the server 220 and control device. In such cases, the control devices 400 may still, for the purposes of explanation, be considered to be "in communication" with the server 220.

From time to time, for example after receipt of condition data from a particular site 50 and indeed from one or more remote sensors 150, the data system 200 is configured to perform a "decision process", as will be described. In such examples, the system (e.g. server) can be considered to perform analysis of data (e.g. condition data, weather data, commodity data, or the like) in order provide, as an outcome, one or more recommendations for operation of control devices 400 at the well infrastructure 100. The decision process may incorporate analysis of data such as temperature inversion techniques, liquid level monitoring analysis, leak detection analysis, such as using condition data to determine Joule-Thompson cooling effects, or fluid mixing effects, etc., as are known.

Such a decision process may be performed before communicating received condition data to the data-storage facility 210 for storing. In other examples, the decision process may be performed at the data-storage facility 210 after storage (e.g. in a batch process).

The decision process may use received condition data and/or condition data stored at a particular data record, so as to determine one or more desired modifications to conditions at a particular well infrastructure 100. For example, based on particular observed conditions at a well infrastructure 100, the system can be configured to determine changes that may be made to change or optimise production (e.g. isolating water ingress), improve safety (e.g. observe failure conditions, and take action), or the like. For example, this may be achieved by observing a variation in condition data associated with one or more locations in well (e.g. variation in pressure, temperature, or indeed noise of a condition data, or the like), and determining that variation to be associated with a change in flow and/or composition conditions at a well, or the like. Subsequently, and based on those new conditions, the system can be configured to determine, or estimate, an associated cause of that variation in conditions. In which case, remedial action may be recommended, such as choking sections or zones in well, or the like.

In this case, the system 200 initially performs a decision process to determine one or more changes to conditions at a well infrastructure 100, and then communicates, to a user, one or more recommendations for changes at that well infrastructure based on the outcome of the decision process. Here, the user can be notified of the recommendations via the network 230 at the remote user device 240.

In some examples, the system 200 can be configured to communicate control data to the control devices 400 based on the outcome of the decision process and/or recommendations communicated to a user.

For some examples or decision outcomes, the system 200 can be configured to communicate control data to control devices 400 when confirmed by a user, for example only when confirmed by a user (e.g. responsive to receiving one or more recommendations, and subsequently having the user confirming those one or more of those recommendations). Put in other similar words, the system 200 can be configured such that based on a particular recommendation, a user is prompted to confirm that the recommendation, or indeed recommendations, should be implemented. In some cases, that confirmation may only be accepted after the user has securely connected (e.g. securely logged in) to the server 220. After receipt of the user confirmation, the server 220 can then communicate control data to the one or more control devices 400 in order to implement the recommendation. Once the control devices 400 have been modified accordingly, the system 200 can notify the user accordingly.

Of course, when a user rejects a particular recommendation, the system 200 may take no action. However, the system can also be configured to allow a user to modify the recommendations or actions, or indeed only select certain recommendations for implementation. In those cases, the system 200 may nevertheless implement the user-defined actions.

The system 200 may also be configured to store data associated with user-defined modification or rejection of recommendations. The storing of such data may be used in subsequent decision processes (e.g. together with condition data). So, for example, when a user continually rejects a particular recommendation in certain circumstances, the system may be configured not to present that recommendation to the user, or present such recommendations to the user but to indicate that that particular recommendation is not often followed/accepted by users. In such a way, the system can "learn" from previous user confirmations.

In other examples or outcomes, the system 200 can be configured to communicate control data to control devices 400 without having been confirmed by a user. This may be applicable in safety critical cases, or on the basis of certain rules. For example, the system 200 can be configurable, by a user, to determine in which particular circumstances to require user confirmation prior to issuing a control data communication. In minor cases or in certain predefined circumstances, the system 200 may be configured to communicate control data to the control devices 400. In those cases, the system 200 may nevertheless communicate to a user the action performed (e.g. prior to and/or after the modification has occurred).

In the above examples, the system may therefore be considered to be (i) autonomous, without the need for user input, (ii) semi-autonomous, with the need for user input in certain circumstances, or indeed (iii) user driven, where a user input is required in order for the system 200 to take action. In each case, "rules" may be established—for example by the user—for when the system 200 operates in each condition, or mode of operation. Those rules may also establish when the system 200 may recommend or take action.

For example, the system 200 can be configured to notify a user based upon rules specified previously. An exemplary rule may include comparing condition data with specific thresholds of data and, if that data is identified as falling inside or outside of the desired threshold, a notification can be communicated to the user (e.g. via the network 230). At the same time, the system 200 can be configured to await user input as to whether to communicate control data to a control device 400, or indeed can take action if the rules require so.

For example, in circumstances when water has been suspected by a sensor device 150 in a given zone, the system 200 can be configured to notify a user and communicate control data so as to choke a valve control device in that zone. Responsive to communicated control data, the system 200 can be configured to confirm that the control device 400 has been changed to the desired operating condition, and communicate a further alert to the user accordingly (e.g. notifying that the action had been performed). Of course, in some examples, the decision process may use analysis of data with multiple recommendations for settings of devices downhole, for example in order to change, and indeed optimise, production at the well infrastructure 100. A user can decide whether to accept some or all recommendations. In each case, the system 200 can be configured to notify a user that changes to control devices have been made.

In some examples, the system 200 can be configured to perform a "confirmation process" subsequent to communicating control data to a control device 400.

The confirmation process may compare an expected outcome of a change in condition at a well infrastructure with the actual outcome of a change in condition at a well (e.g. based on received condition data). In such a way, the system can "learn" from previous decision outcomes. The system 200 may be configured to store the outcome of a confirmation process (e.g. at the data store 210), and associate a weighting factor with that corresponding decision process based on a comparison between the expected and actual change in conditions (e.g. the closer the actual/expected conditions, the greater the weighting factor).

For subsequent decision processes (e.g. and user notifications), a user may be informed of a weighting factor associated with a particular decision outcome (e.g. to guide the user as to likelihood of actual conditions being modified). The weighting factor may be considered to be a confidence factor, or the like. A weighting factor may be averaged across multiple same or similar decision outcomes, and indeed the system can be configured to aggregate weighting factors across multiple well infrastructures 100, thus improving the veracity of the weighting factor. In such a way, an operator of one particular well infrastructure 100 benefits from the use of data from other well infrastructures 100.

Figure 5:
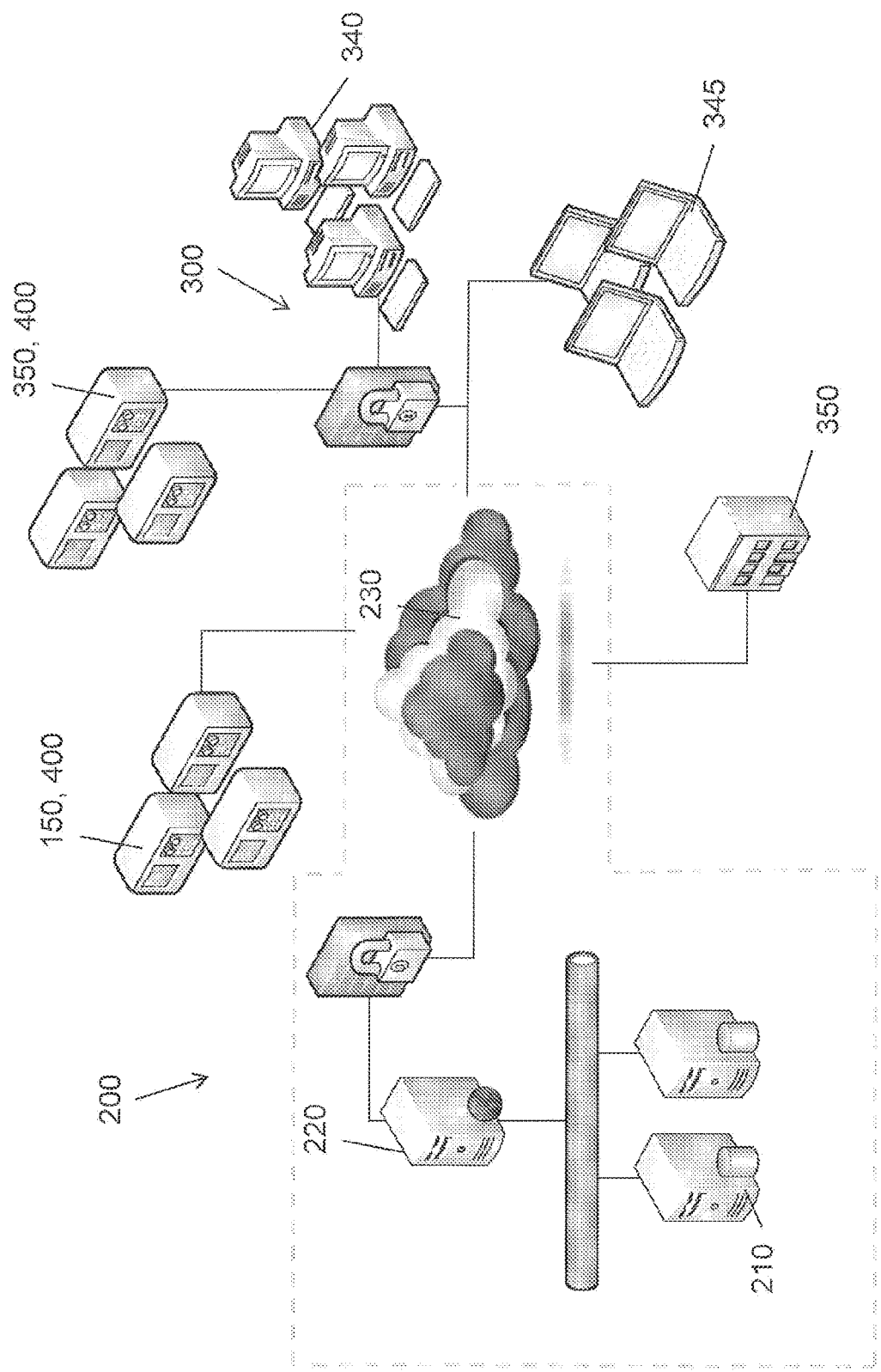
FIG. 5 shows an example of the data system of FIG. 2 or 4 being remotely hosted.

It will be appreciated that the above described system 200 may be implemented by integrating the data-storage facility 210 and server 220 with existing remote sensors 150, control devices 400 and networks (e.g. used already by would-be users). For example, consider now FIG. 5 in which server 220 is connected to an existing network 300 of sensor/control devices 350, 400 and users 340. Again, however, the data-storage facility 210 can be accessed via a network 230, such as the Internet, or the like. Again, in this example, remote user access 345 can be provided, via the network 230 (e.g. using a web-based interface, having log in requirements). In the example shown in FIG. 5, third parties 350, may also be in communication with system 200, and may permit the use of a third party application programming interface for use with stored condition data (as is true of the example shown in FIG. 2). In the example shown in FIG. 5, the server 220 and data-storage facility 210 may be considered to be remotely hosted from the existing network 300. In such a way, the data-storage facility 210 can be used as a centralised repository for data.

Figure 6:
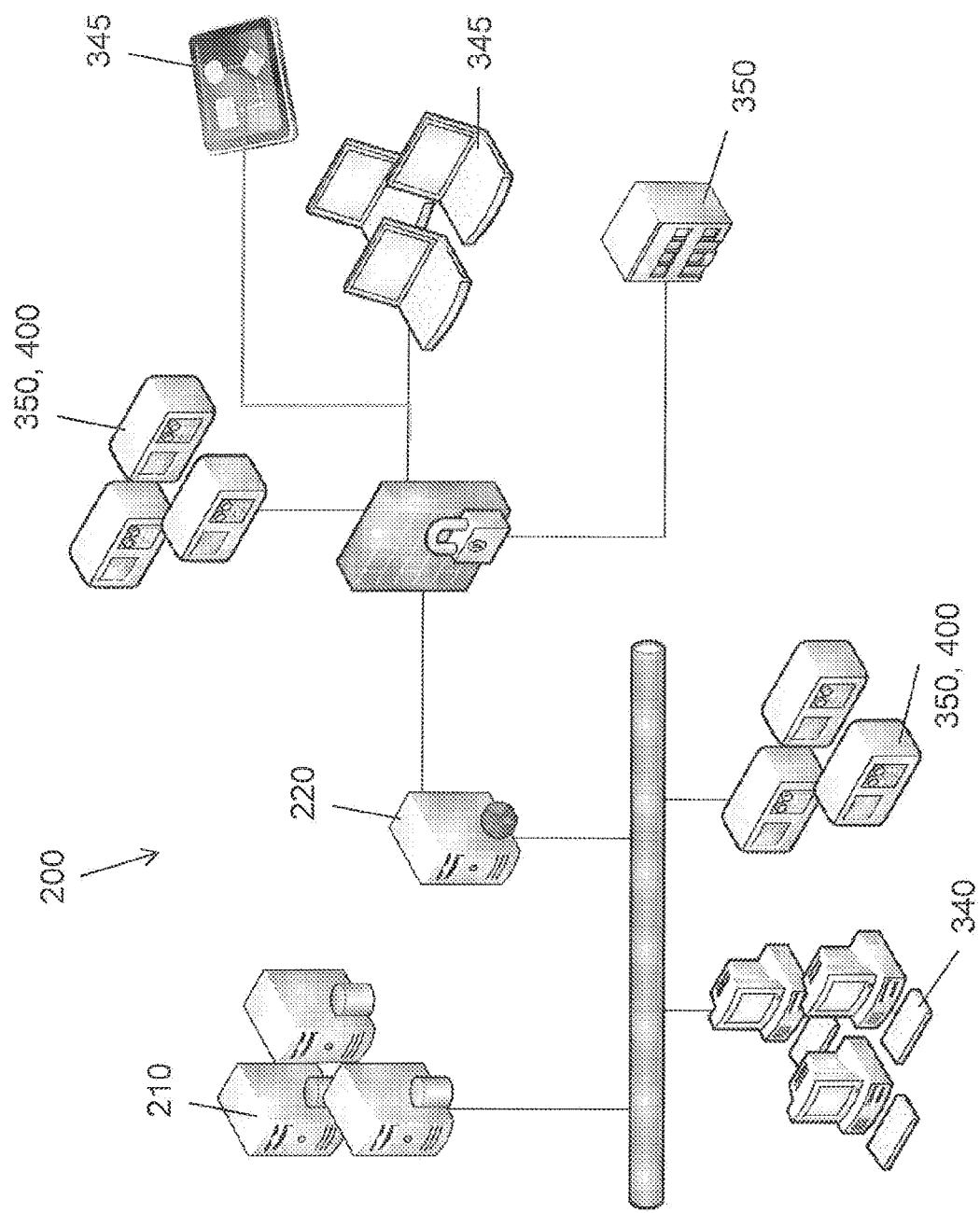
FIG. 6 shows an example of the data system of FIG. 2 or 4 being locally hosted.

Of course, in other examples, the server 220 and data storage facility 210 may be considered to be locally-hosted, providing access to condition data mainly using a local network, as is shown in FIG. 6. Access to the data-storage facility 210 may be possible by accessing a local network. Again, however, web-based user interface and access may be provided.

While functions described above have been described in relation to being performed at the server 220 or the data-storage facility 210, it will be appreciated that in other examples, those functions may be performed by alternative devices while still implementing the inventive concept. Further, while shown as discrete hardware units, it will be appreciate that some of the above functions may be performed partially or entirely on software, performed on virtualised hardware. A skilled reader will readily be able to implement the various alternatives accordingly.

The above described systems, devices and methods may allow user to obtain securely condition data, and to process data collected and at the same time being able to comprehend large volumes of data quickly and accurately, which may be vital when making safe and effective decisions on the management and control of an asset or well infrastructure. Further, the ability to communicate, quickly and effectively, alerts and recommendations, and indeed implement modified conditions at a well, can optimise performance and/or improve safety.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the invention may consist of any such individual feature or combination of features. In view of the foregoing description it will be evident to a person skilled in the art that various modifications may be made within the spirit and scope of the invention.

The invention claimed is:

1. A data system, comprising:
   a data-storage facility configured to store data records associated with particular well infrastructures;
   one or more remote sensor devices configured to monitor conditions at the particular well infrastructures, and to collect condition data corresponding to the conditions;
   a network-enabled server, in communication with the data-storage facility, and configured to,
      receive periodically, via a network, the collected condition data from the one or more remote sensor devices, and
      communicate the received condition data to the data-storage facility for storing in appropriate data records; and
   one or more control devices in communication with the server, the one or more control devices configured to modify conditions at the particular well infrastructures; and
   the system being configured to facilitate user access, via the network, to the data records comprising the condition data stored at the data-storage facility, and wherein
   the server is further configured to communicate control data with the one or more control devices in order to control, or modify, operating configurations of the one or more control devices, and
   the system is further configured to,
      perform a decision process by analyzing data in order to provide, as an outcome, recommendations for operation of the one or more control devices at the particular well infrastructures, and
      perform a confirmation process, subsequent to communicating the control data to the one or more control devices, by receiving the condition data and comparing an expected outcome of a change in condition at one or more of the particular well infrastructures with an actual outcome of a change in condition at the one or more of the particular well infrastructures.

2. The system according to claim 1, wherein at least one of:
   (i) the one or more remote sensor devices comprise distributed sensors, the distributed sensors configured to measure distributed conditions along some or all of a length of a well or pipeline structure; and
   (ii) the one or more remote sensor devices comprise point sensors configured to measure conditions at one or more specific locations at the well or the pipeline structure.

3. The system according to claim 1, wherein the condition data comprises temperature data, pressure data and/or acoustic data.

4. The system according to claim 1, wherein the system is further configured to perform a validation process on the condition data received from the one or more remote sensor devices.

5. The system according to claim 4, wherein responsive to the validation process, the system is further configured to discard the received condition data.

6. The system according to claim 4, wherein responsive to the validation process, the server is further configured to set an alert status in relation to the condition data, the alert status and the condition data then being communicated to the data-storage facility for storing.

7. The system according to claim 6, wherein the server is further configured to communicate the alert status to a remote user, via the network, responsive to the validation process.

8. The system according to claim 4, wherein the validation process comprises:
   comparing the received condition data with one or more expected thresholds for the received condition data; and
   confirming the received condition data to be invalid or that the respective particular well infrastructure is operating at conditions that require user notification, when the received condition data is beyond the respective expected threshold.

9. The system according to claim 8, wherein at least one of:
   (i) when the condition data comprises temperature data and/or pressure data, the one or more expected thresholds relate to predefined temperature/pressure values; and
   (ii) the one or more expected thresholds values are user defined.

10. The system according to claim 4, wherein the validation process comprises:
    determining an identification of a source of the received condition data; and
    confirming that the received condition data is valid when the received condition data is from an expected source.

11. The system according to claim 1, wherein at least one of:
    (i) the network-enabled server is further configured to receive the condition data automatically from the one or more remote sensor devices; and
    (ii) the network-enabled server is further configured to receive the condition data after receipt, via the network, of a user request.

12. The system according to claim 1, wherein the system is further configured to combine the condition data received from one time interval to another time interval when the condition data is stored at the data-storage facility.

13. The system according to claim 12, wherein the system is further configured to average the received condition data received, and store the averaged data.

14. The system according to claim 13, wherein the system is further configured to average the condition data received for a defined period, such as a day, week, or month.

15. The system according to claim 1, wherein at least one of:
    (i) the system is further configured to facilitate remote user communication and storage of additional record data, via the network, to the data records comprising the condition data stored at the data-storage facility;

(ii) the system is further configured to facilitate the remote user access, via a web-based user interface, to certain data records comprising the condition data stored at the data-storage facility; and (iii) the system is further configured to restrict access to the stored data based on user privileges, those user privileges being stored at the server.

16. The system according to claim 1, wherein at least one of:
(i) data used in the decision process includes the condition data received from the one or more remote sensor devices; and
(ii) the system is configured to perform the decision process subsequent to receiving the condition data from the one or more remote sensor devices.

17. The system according to claim 1, wherein the system is further configured to communicate, to a user, one or more recommendations for change at the particular well infrastructure based on the outcome of the decision process.

18. The system according to claim 17, wherein the system is further configured to facilitates the remote user access, via the network, to the data records comprising the condition data by communicating the condition data to the user at the same time as the one or more recommendations.

19. The system according to claim 1, wherein the system is further configured to communicate the control data to the one or more control devices based on the outcome of the decision process and/or the recommendations communicated to a user.

20. The system according to claim 19, wherein the system is further configured to communicate the control data, only when confirmed by the user responsive to receiving the recommendation via the network.

21. The system according to claim 19, wherein the system is further configured to communicate the control data without having been confirmed by the user.

22. The system according to claim 20, wherein the system is further configurable, by the user, to determine in which particular circumstances to require the user confirmation prior to issuing the control data communication.

23. The system according to claim 1, wherein the system is further configured to:
store the outcome of the confirmation process at the data-storage facility; and
associate a weighting factor with the associated decision process based on the comparison between the expected and actual change in conditions.

24. The system according to claim 23, wherein the system is configured, for subsequent decision processes, to communicate to a user a stored weighting factor associated with a particular decision outcome of the same or similar decision processes.

25. A data system, comprising:
a data-storage facility configured to store data records associated with well infrastructure;
a network-enabled server, in communication with the data-storage facility and configured to receive periodically, via a network, data associated with the well infrastructure, the server configured to communicate the received data to the data-storage facility for storing in an appropriate data record;
the system is further configured to facilitate user access to the data records stored at the data-storage facility; and
one or more control devices in communication with the server, the one or more control devices configured to modify conditions at the well infrastructure, and wherein
the server is further configured to communicate control data with the one or more control devices in order to control, or modify, operating configurations of the one or more control devices, and
the system is further configured to,
perform a decision process by analyzing data in order to provide, as an outcome, recommendations for operation of the one or more control devices at the well infrastructure, and
perform a confirmation process, subsequent to communicating the control data to the one or more control devices, by receiving the condition data and comparing an expected outcome of a change in condition at the well infrastructure with an actual outcome of a change in condition at the well infrastructure.

26. A data system, comprising:
one or more remote sensor devices configured to monitor conditions at a particular well infrastructure, and to collect condition data corresponding to those conditions;
the one or more remote sensors further being configured to communicate, periodically, via a network, the condition data to a network-enabled server, for storage at a data-storage facility in appropriate data records corresponding to the particular well infrastructure; and
one or more control devices in communication with the server, the one or more control devices configured to modify conditions at the particular well infrastructure, and wherein
the server is configured to communicate control data with the one or more control devices in order to control, or modify, operating configurations of the one or more control devices, and
the system is further configured to,
perform a decision process by analyzing data in order to provide, as an outcome, recommendations for operation of the one or more control devices at the particular well infrastructure, and
perform a confirmation process, subsequent to communicating the control data to the one or more control devices, by receiving the condition data and comparing an expected outcome of a change in condition at the particular well infrastructure with an actual outcome of a change in condition at the particular well infrastructure.

* * * * *